US010355578B2

(12) United States Patent
Nishijima

(10) Patent No.: US 10,355,578 B2
(45) Date of Patent: Jul. 16, 2019

(54) SWITCHING POWER SUPPLY WITH MAIN SWITCHING DEVICE AND SECONDARY SWITCHING DEVICE

(71) Applicant: Fuji Electric Co., Ltd., Kanagawa (JP)

(72) Inventor: Kenichi Nishijima, Toyama (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/696,977

(22) Filed: Sep. 6, 2017

(65) Prior Publication Data
US 2018/0109173 A1 Apr. 19, 2018

(30) Foreign Application Priority Data

Oct. 13, 2016 (JP) .................................. 2016-202149

(51) Int. Cl.
*H02M 1/08* (2006.01)
*H02M 3/335* (2006.01)
(Continued)

(52) U.S. Cl.
CPC ......... *H02M 1/08* (2013.01); *H02M 3/33569* (2013.01); *H02M 1/088* (2013.01);
(Continued)

(58) Field of Classification Search
CPC .. H02M 1/32; H02M 1/36; H02M 2001/0058; H02M 2001/0032;
(Continued)

(56) References Cited

U.S. PATENT DOCUMENTS 5,973,939 A 10/1999 Tan
6,249,444 B1* 6/2001 Cross ................ H02M 3/33569
363/131
(Continued)

FOREIGN PATENT DOCUMENTS

JP 2002-252973 A 9/2002
JP 2005-295662 A 10/2005
(Continued)

OTHER PUBLICATIONS

U.S. Appl. No. 15/177,634, filed Jun. 9, 2016.

*Primary Examiner* — Gustavo A Rosario-Benitez
(74) *Attorney, Agent, or Firm* — Chen Yoshimura LLP

(57) ABSTRACT

A switching power supply includes a SiC MOSFET (a main switching device) that switches a main current flowing through a primary coil of a transformer ON and OFF as well as a Si MOSFET (a secondary switching device) that has a lower power capacity than the main switching device and is arranged in parallel therewith. A control circuit includes a driver circuit that respectively switches the main switching device and the secondary switching device ON and OFF on the basis of a control signal generated in accordance with an output voltage obtained from a secondary coil of the transformer. The control circuit further includes an enable control circuit that disables the ON/OFF switching of the main switching device when a voltage of an auxiliary voltage obtained from an auxiliary coil of the transformer is less than a prescribed threshold voltage.

17 Claims, 10 Drawing Sheets

(51) Int. Cl.
*H02M 1/088* (2006.01)
*H02M 1/00* (2006.01)

(52) U.S. Cl.
CPC ............... *H02M 2001/0032* (2013.01); *H02M 2001/0054* (2013.01); *Y02B 70/1483* (2013.01); *Y02B 70/1491* (2013.01); *Y02B 70/16* (2013.01)

(58) Field of Classification Search
CPC . H02M 2001/0035; H02M 2001/0054; H02M 1/08; H02M 1/088; H02M 3/33546; H02M 3/33584; H02M 3/33507; H02M 3/33569; H02M 3/33553; H02M 3/33523; Y02B 70/1491; Y02B 70/1433
See application file for complete search history.

(56) References Cited

U.S. PATENT DOCUMENTS

| | | | |
|---|---|---|---|
| 2003/0063480 A1* | 4/2003 | Morita | H02M 1/34 363/37 |
| 2004/0075600 A1* | 4/2004 | Vera | H02J 1/102 341/166 |
| 2006/0285365 A1* | 12/2006 | Huynh | H02M 3/33523 363/16 |
| 2007/0279945 A1 | 12/2007 | Salato | |
| 2009/0262559 A1 | 10/2009 | Kaneko | |
| 2012/0300506 A1 | 11/2012 | Lee et al. | |
| 2013/0063985 A1 | 3/2013 | Ye et al. | |
| 2013/0235623 A1 | 9/2013 | Huang | |
| 2014/0146576 A1 | 5/2014 | Yang | |
| 2014/0334195 A1* | 11/2014 | Nussbaum | H02M 3/3376 363/21.04 |
| 2015/0222193 A1* | 8/2015 | Zambetti | H02M 3/33546 363/21.02 |
| 2015/0230300 A1* | 8/2015 | Knoedgen | H05B 33/0815 315/219 |
| 2017/0012542 A1 | 1/2017 | Nishijima | |
| 2017/0155335 A1* | 6/2017 | Chang | H02M 1/08 |

FOREIGN PATENT DOCUMENTS

JP   2008-306887 A   12/2008
JP   2013-164783 A   8/2013

\* cited by examiner

Vg Waveform during Continuous Switching

Frequency Reduction (Applied during Primary Side Regulation)

Frequency Reduction + Burst Control (Applied during Secondary Side Regulation)

SWITCHING POWER SUPPLY WITH MAIN SWITCHING DEVICE AND SECONDARY SWITCHING DEVICE

BACKGROUND OF THE INVENTION

Technical Field

The present invention relates to a switching power supply that has a simple configuration and makes it possible to reduce switching loss in a switching device, increase power conversion efficiency while under heavy load, and reduce power consumption while in standby mode.

Background Art

One example of a switching power supply 1 having a rated power capacity of approximately several dozen watts is the flyback DC-DC converter illustrated in FIG. 5. This switching power supply 1 includes a diode bridge circuit DB that full-wave rectifies AC power supplied from a commercial 100V or 220V AC power source on the input side as well as an input capacitor Cin that smooths the output from the diode bridge circuit DB.

Moreover, as illustrated in FIG. 5, first and second noise filters NF1 and NF2 as well as a capacitor Cx are arranged on an AC power input line that is upstream of the diode bridge circuit DB. Furthermore, a resistor Rx is connected in parallel to the capacitor Cx in order to discharge the charge stored in the capacitor Cx when the power source is shut off. The first and second noise filters NF1 and NF2 and the capacitor Cx prevent high frequency conductive noise (electromagnetic interference (EMI)) generated during operation of the switching power supply 1 from leaking back to the AC power input line side.

A main device 1a that constitutes a main component of the switching power supply 1 includes a transformer T in which one end of a primary coil Ta is connected to a positive output terminal of the diode bridge circuit DB. The other end of the primary coil Ta of the transformer T is connected to a switching device Q that switches current flowing through the primary coil Ta ON and OFF. This switching device Q is a high-power MOSFET selected according to the rated power capacity of the switching power supply 1, for example.

The main device 1a further includes a diode D that rectifies an AC voltage induced in a secondary coil Tb of the transformer T as the switching device Q is switched ON and OFF and an output capacitor Cout that smooths the rectified output from the diode D. Together, the diode D and the output capacitor Cout form a voltage output circuit that generates a prescribed output voltage Vout.

Meanwhile, a control circuit 2 that is integrated as a power supply IC cooperates with an output voltage detection circuit 3 that detects the output voltage Vout and generates a feedback signal, for example. The control circuit 2 generally controls the ON/OFF operation (switching) of the switching device Q in accordance with the feedback signal. Here, the output voltage detection circuit 3 includes a resistor circuit that divides and detects the output voltage Vout and that is constituted by voltage-dividing resistors Ra and Rb connected in series, for example. The output voltage detection circuit 3 further includes a shunt regulator SR that obtains a voltage difference between a detected output voltage from the resistor circuit that divides and detects the output voltage Vout and a predetermined reference voltage that defines a target output voltage, for example.

The output voltage detection circuit 3 feeds the voltage difference obtained by the shunt regulator SR back to the control circuit 2 as the feedback signal via a photocoupler PC, for example. The control circuit 2 then, in accordance with a voltage $V_{FB}$ of the feedback signal, feedback-controls the pulse width (ON time) of a drive signal for switching the switching device Q ON and OFF in order to change the switching frequency fsw of the switching device Q, for example. This feedback control of the switching frequency fsw keeps the voltage Vout of the output voltage fixed at the target voltage.

In other words, the control circuit 2 includes a voltage-controlled oscillator in which the oscillating frequency is controlled in accordance with an externally input control voltage. This oscillator generates a triangular wave signal using the charges and discharges of a built-in capacitor and also generates a rectangular wave signal that is synchronized with the triangular wave signal. The control circuit 2 further includes a pulse-width modulation (PWM) control comparator that compares the voltage of the triangular wave signal generated by the oscillator to the voltage $V_{FB}$ of the feedback signal in order to generate a control signal having a pulse width that defines the ON time Ton of the switching device Q. A driver circuit arranged on the output side of the control circuit 2 takes as input the control signal output from the PWM control comparator and generates the drive signal for switching the switching device Q ON and OFF.

This type of output voltage Vout control scheme is widely used in this type of switching power supply in the 10 to 90 W class with an output voltage Vout of 12V, 19V, or 32V and is typically known as a secondary-side regulated scheme. Meanwhile, in the 10 W class with an output voltage Vout of 5V and an output current of less than or equal to 2 A, a so-called primary-side regulated scheme (not illustrated in any of the figures) in which the voltage Vout of the output voltage is controlled in accordance with a voltage induced in an auxiliary coil Tc of the transformer T is more commonly used.

The control circuit 2 controls the switching frequency fsw of the switching device Q in accordance with the voltage $V_{FB}$ of the feedback signal (which changes according to the magnitude of the load), thereby implementing a frequency control feature for reducing switching loss in the switching device Q. As is described in detail in Patent Document 1, for example, this type of frequency control feature typically decreases the switching frequency fsw of the switching device Q in accordance with the voltage $V_{FB}$ of the feedback signal when that voltage $V_{FB}$ becomes less than a prescribed threshold voltage.

More specifically, as illustrated in FIGS. 6A and 6B, for example, the frequency control feature reduces the switching frequency fsw, in accordance with decreases in the voltage $V_{FB}$ of the feedback signal, from a maximum switching frequency fsw-max (such as 65 kHz) for when the load is heaviest to a minimum switching frequency fsw-min (such as 25 kHz) for when the load is light. Furthermore, when the voltage $V_{FB}$ decreases even further in response to decreases in the load power, the frequency control feature reduces the switching frequency fsw to a frequency even less than the minimum switching frequency fsw-min, such as approximately 0.5 kHz.

This type of switching frequency fsw reduction control scheme further reduces switching loss in the switching device Q and makes it possible to minimize power consumption in a so-called standby mode. This type of frequency reduction control is used widely but exclusively in primary-side regulated control schemes.

Furthermore, as disclosed in Patent Document 2 there has been proposed a so-called burst switching control scheme in which, as illustrated in FIGS. 7A and 7B, for example, instead of the additional reduction in the switching frequency fsw, the switching device Q is intermittently driven in a burst switching manner at a prescribed interval in the standby mode. This burst switching drive scheme further reduces power consumption in standby mode. This type of burst switching control scheme is widely used in secondary-side regulated switching power supply.

In addition, although this is not directly related to the main aspects of the present invention, in Patent Document 3, as the output currents from a plurality of power supply circuits increase due to a load, a plurality of FETs connected in parallel are turned ON in a sequential manner under prescribed operating conditions in order to balance the load between the power supply circuits. However, in the technology disclosed in Patent Document 3, the plurality of FETs are simply being used as a current output switch. Furthermore, connecting a plurality of switching devices Q that each have a prescribed power capacity together in parallel in order to achieve a desired power capacity rating for the overall switching power supply is a conventionally well-known and widely used technique.

RELATED ART DOCUMENTS

Patent Documents

Patent Document 1: Japanese Patent Application Laid-Open Publication No. 2002-252973
Patent Document 2: Japanese Patent Application Laid-Open Publication No. 2005-295662
Patent Document 3: Japanese Patent Application Laid-Open Publication No. 2013-164783

SUMMARY OF THE INVENTION

As described above, conventional approaches for reducing loss in switching power supplies 1 while in standby mode include switching frequency fsw reduction control as well as intermittent burst switching control of the switching device Q. However, if a high-power FET that satisfies the desired power capacity rating for the switching power supply 1 is used for the switching device Q, the switching loss in the FET while in standby mode cannot be ignored. This switching loss is caused entirely by the output capacitance Coss and the gate charge Qg, which are determined by the structure of the FET device.

FIG. 8A shows an example of the device characteristics of a general-purpose MOSFET in the 600V class and illustrates the relationship between rated current Id and output capacitance Coss and gate charge Qg. Moreover, FIG. 8B provides a comparison of the switching loss B that occurs in the abovementioned general-purpose MOSFET (the switching device Q) when operated using a continuous switching scheme with a switching frequency fsw of 1 kHz while in standby mode and the switching loss A that occurs when the switching device Q is operated using a burst switching scheme with a switching frequency fsw of 25 kHz while in standby mode.

In the burst switching scheme for the switching device Q, the burst period tburst was set to 200 ms, the burst switching time tsw-on was set to 0.28 ms, and the switching frequency fsw was set to 25 kHz.

Here, the switching loss A that occurs when the switching device Q is operated using the burst switching scheme is given by:

$$A=(\tfrac{1}{2}) \times Coss \times Vds^2 \times fsw \times (tsw\text{-on}/tburst) + Vcc \times Qg \times fsw \times (tsw\text{-on}/tburst)$$

Moreover, the switching loss B that occurs when the switching device Q is operated using the continuous switching scheme can be calculated by setting tsw-on=tburst in the equation above because the switching off time tsw-off of the switching device Q is equal to 0.

In a switching power supply 1 with an output voltage Vout of 19V and a rated power capacity of 65 W, for example, it is common for a switching device Q (MOSFET) with a drain current Id of 10 A to be used. As illustrated in FIG. 8A, at a rated current of 10 A, the output capacitance Coss of this type of switching device Q (MOSFET) has a relatively large value of approximately 150 pF, and the gate charge Qg has a similarly large value of approximately 50 nC.

As a result, as shown in the calculated examples of the switching losses A and B in FIG. 8B, at a rated current of 10 A, the switching loss B associated with the continuous switching scheme can be as high as 15 mW. This switching loss would therefore represent a significant problem in designing a switching power supply 1 that keeps power consumption less than or equal to 30 mW while in standby mode, for example.

Moreover, as respectively illustrated in FIGS. 9A and 9B, recent trends in requirements show demand for higher power conversion efficiencies than in conventional technologies while under heavy load as well as demand for further reductions in standby power while under light load and particularly while in standby mode. In FIGS. 9A and 9B, the dashed lines indicate trends in conventional requirements defined under 2009 EC (European Commission), and the dot-dashed lines indicate recent trends in requirements defined under 2013 DOE (Department of Energy). The solid lines indicate current trends in requirements defined under 2013 EC-V5.

One conceivable way to satisfy these requirements would be to replace the Si MOSFETs that have typically been used as switching devices Q in conventional technologies with SiC MOSFETs, which exhibit lower on-resistance than Si MOSFETs. However, when relatively low control voltages of approximately 10V to 15V are applied to the gates of SiC MOSFETs, the SiC MOSFETs cannot fully exhibit their low on-resistance. Moreover, low control voltages can also potentially cause thermal runaway in SiC MOSFETs.

Meanwhile, the driver circuit for switching the switching device Q such as a Si MOSFET or an IGBT ON and OFF is powered entirely by a supply voltage Vcc obtained from the auxiliary coil Tc of the transformer T. Moreover, this driver circuit is typically configured to output a gate control voltage Vgs of approximately 10V to 15V, which is set by the supply voltage Vcc. Therefore, if a Si MOSFET is simply replaced with a SiC MOSFET as the switching device Q, it is not possible to reliably switch the SiC MOSFET ON and OFF using a typical conventional driver circuit.

One potential solution would therefore be to set the supply voltage Vcc obtained from the auxiliary coil Tc of the transformer T and supplied to the driver circuit to a relatively high value of approximately 18V and to also set the gate control voltage Vgs that switches ON the SiC MOSFET to 18V.

However, as illustrated in FIG. 10A, for example, the supply voltage Vcc obtained from the auxiliary coil Tc of the transformer T decreases rapidly in response to decreases in the output current Iout when the load is light. Furthermore, as illustrated in FIG. 10B, if the supply voltage Vcc decreases to less than or equal to 15V, SiC MOSFETs used for the switching device Q can no longer be switched ON and OFF correctly.

The present invention was made in light of the foregoing and aims to provide a switching power supply that has a simple configuration and makes it possible to effectively utilize the device characteristics of SiC MOSFETs to reduce switching loss, increase power conversion efficiency while under heavy load, and reduce power consumption while in standby mode. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including: a main switching device made of a SiC MOSFET, configured to be attached to a primary coil of a transformer so as to switch a current flowing in the primary coil ON and OFF; a secondary switching device connected in parallel with the main switching device and made of a Si MOSFET so as to switch the main current ON and OFF instead of the main switching device; and a control circuit that controls ON/OFF switching of the main switching device and the secondary switching device in accordance with a feedback voltage representing an output voltage obtained from a secondary coil of the transformer, the control circuit generating a control signal in accordance with the feedback signal, wherein the control circuit includes: a driver circuit that operates using an auxiliary voltage obtained from an auxiliary coil of the transformer as a supply voltage and that switches the main switching device and the secondary switching device ON and OFF based on the control signal; and an enable control circuit that controls, in accordance with the auxiliary voltage obtained from the auxiliary coil of the transformer, whether to enable driving of the main switching device and driving of the secondary switching device by the driver circuit.

The main switching device may be a high-power SiC MOSFET that satisfies a prescribed load power capacity, and the secondary switching device may be a Si MOSFET with a lower power capacity than the main switching device. It is preferable that the secondary switching device be a low-power Si MOSFET that is integratable into the control circuit.

It is preferable that the driver circuit include: a main driver circuit that generates, in accordance with the control signal, a main drive signal for switching the main switching device ON and OFF; and a secondary driver circuit that generates, in accordance with the control signal, a secondary drive signal for switching the secondary switching device ON and OFF. When the auxiliary voltage obtained from the auxiliary coil of the transformer is greater than a prescribed threshold voltage, the enable control circuit may generate an enable signal that is set to HIGH and provide the HIGH enable signal to the main driver circuit and an inverse of the HIGH enable signal to the secondary driver circuit, respectively, so as to enable operation of the main driver circuit and disable operation of the secondary driver circuit, and when the auxiliary voltage obtained from the auxiliary coil of the transformer is less than the prescribed threshold voltage, the enable control circuit may generate the enable signal that is set to LOW and provide the LOW enable signal to the main driver circuit and an inverse of the LOW enable signal to the secondary driver circuit, respectively, so as to disable operation of the main driver circuit and enable operation of the secondary driver circuit.

Alternatively, the driver circuit may include, for example: a secondary driver circuit that generates, in accordance with the control signal, a secondary drive signal for switching the secondary switching device ON and OFF; and a main driver circuit that generates, in accordance with the secondary drive signal generated by the secondary driver circuit, a main drive signal for switching the main switching device ON and OFF. When the auxiliary voltage obtained from the auxiliary coil of the transformer is greater than a prescribed threshold voltage, the enable control circuit may generate an enable signal that is set to HIGH and provide the HIGH enable signal to the main driver circuit so as to enable operation of the main driver circuit, and when the auxiliary voltage obtained from the auxiliary coil of the transformer is less than the prescribed threshold voltage, the enable control circuit may generate the enable signal that is set to LOW and provide the LOW enable signal to the main driver circuit so as to disable operation of the main driver circuit.

It is preferable that the control circuit include a switching frequency control unit that reduces a switching frequency at which the main switching device and the secondary switching device are switched ON and OFF from a maximum switching frequency towards a first switching frequency in accordance with decreases in power consumption of a load, and when the power consumption of the load becomes less than a prescribed threshold power while the main switching device and the secondary switching device are being continuously switched at the first switching frequency, the switching frequency control unit may further reduce the switching frequency of the main switching device and the secondary switching device, or the switching frequency of the secondary switching device, to a value less than the first switching frequency.

The control circuit may include a switching frequency control unit that reduces a switching frequency at which the main switching device and the secondary switching device are switched ON and OFF from a maximum switching frequency towards a first switching frequency in accordance with decreases in power consumption of a load, and when the power consumption of the load becomes less than a prescribed threshold power while the main switching device and the secondary switching device are being continuously switched at the first switching frequency, the control circuit may drive the main switching device and the secondary switching device, or the secondary switching device only, in a burst switching mode with prescribed burst period and frequency.

When the switching frequency control unit reduces the switching frequency from the maximum switching frequency to the first switching frequency, and when the feedback voltage and the auxiliary voltage obtained from the auxiliary coil of the transformer are reduced thereby, the enable control circuit may disable operation of the main switching device.

Furthermore, the prescribed threshold power for evaluating the power consumption of the load may correspond to a threshold voltage for the auxiliary voltage at which a standby mode is enabled and operation of the main switching device is disabled.

It is preferable that the main switching device and the secondary switching device be configured to be respectively connected in series to the primary coil of the transformer and arranged between a power supply terminal and a ground terminal to form a flyback converter.

The switching power supply may further include another main switching device that is connected in series to the main switching device to form a main half-bridge circuit and that is switched ON and OFF complementarily relative to the main switching device; and another secondary switching device that is connected in series to the secondary switching device to form a secondary half-bridge circuit and that is switched ON and OFF complementarily relative to the secondary switching device, and the main half-bridge circuit and the secondary half-bridge circuit may be respectively configured in parallel with an LLC current-resonant circuit in which an inductor and a capacitor are connected in series to the primary coil of the transformer.

The switching power supply according to one aspect of the present invention uses a SiC MOSFET as the main switching device that switches the main current flowing through the primary coil of the transformer ON and OFF and uses a Si MOSFET as the secondary switching device that is arranged in parallel with the main switching device and switches the main current flowing through the primary coil of the transformer ON and OFF. Moreover, the enable control circuit disables the ON/OFF switching of the main switching device and makes only the secondary switching device switch ON and OFF when the voltage of the auxiliary voltage obtained from the auxiliary coil of the transformer is less than the prescribed threshold voltage.

Therefore, the present invention makes it possible to reduce switching loss while under light load by controlling the switching devices in accordance with the voltage of the output voltage. The present invention also makes it possible to take full advantage of the performance of the SiC MOSFET when switching the current flowing through the primary coil of the transformer ON and OFF while under heavy load. This makes it possible to increase the power conversion efficiency of the switching power supply while under heavy load.

The present invention is particularly focused on the voltage of the auxiliary voltage obtained from the auxiliary coil of the transformer and used to power the driver circuit as well as disabling the ON/OFF switching of the main switching device while under light load. Therefore, the present invention has a simple configuration and makes it possible to effectively reduce switching loss while under light load as well as increase power conversion efficiency while under heavy load. It is to be understood that both the foregoing general description and the following detailed description are exemplary and explanatory, and are intended to provide further explanation of the invention as claimed.

DETAILED DESCRIPTION OF EMBODIMENTS

Figure 1:
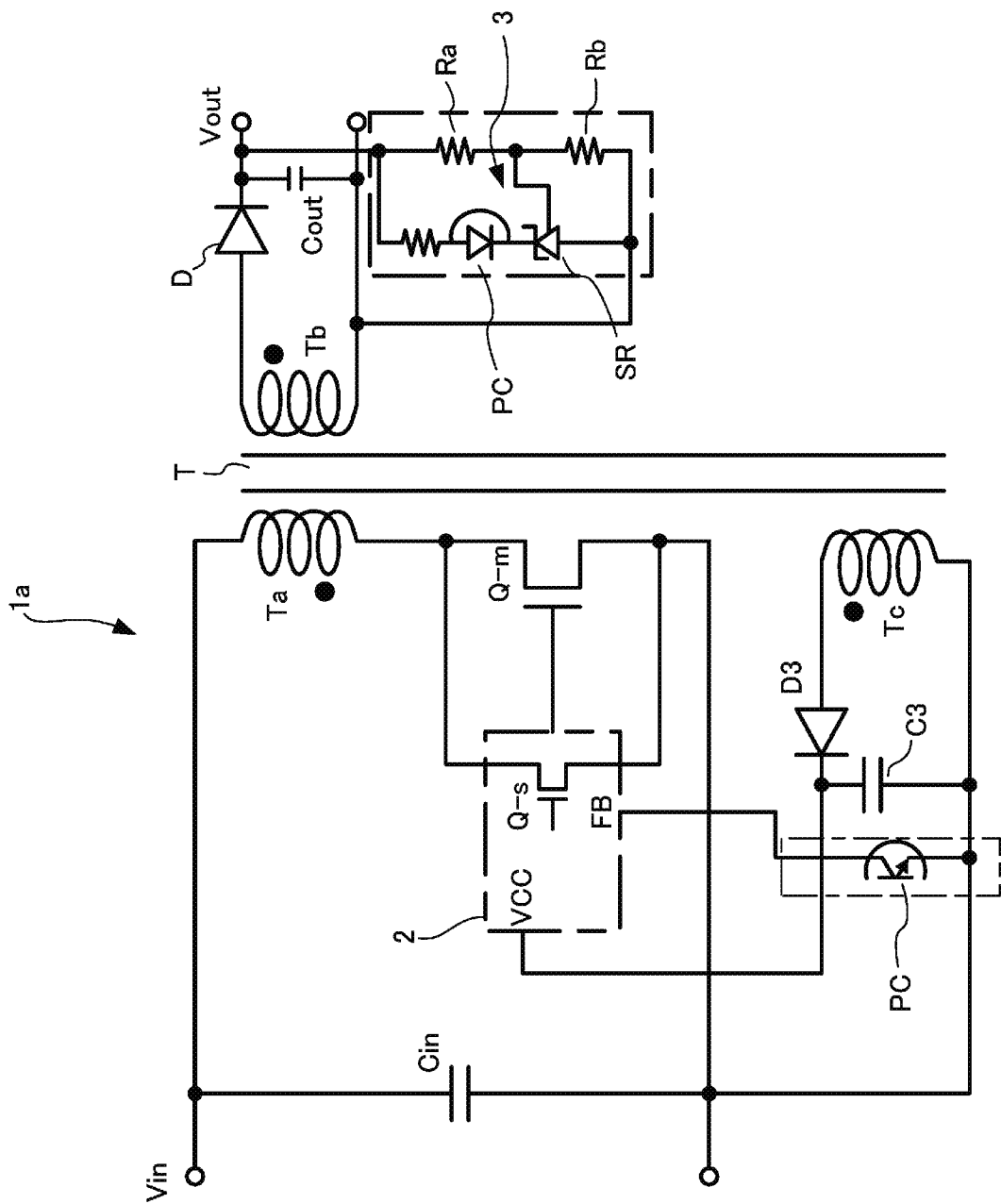
FIG. 1 schematically illustrates a configuration of the main components of a switching power supply according to an embodiment of the present invention.

Next, switching power supplies according to embodiments of the present invention will be described with reference to figures. The present invention is suitable for application to switching power supplies with a rated power capacity of approximately several dozen watts, for example.

A switching power supply 1a according to an embodiment of the present invention is a secondary-side regulated flyback DC-DC converter, for example. This flyback DC-DC converter has substantially the same configuration as was described in reference to FIG. 5. Therefore, here the same reference characters will be used for components that are the same as in the switching power supply 1 illustrated in FIG. 5.

FIG. 1 schematically illustrates a configuration of the main components of the switching power supply 1a according to the present embodiment. The switching power supply 1a includes, as switching devices Q that are connected in series to a primary coil Ta of a transformer T, a main switching device Q-m and a secondary switching device Q-s that is connected in parallel to the main switching device Q-m.

The main switching device Q-m is a high-power SiC MOSFET that satisfies the required load power capacity rating. The secondary switching device Q-s is a conventional Si MOSFET with a lower power capacity than the main switching device Q-m. More specifically, the main switching device Q-m is a high-power SiC MOSFET of the 600V class and having a maximum drain current Id of approximately 10 A, for example. Moreover, the secondary switching device Q-s is a low-power Si MOSFET of the 600V class and having a maximum drain current Id of approximately 10 mA, for example.

Figure 2:
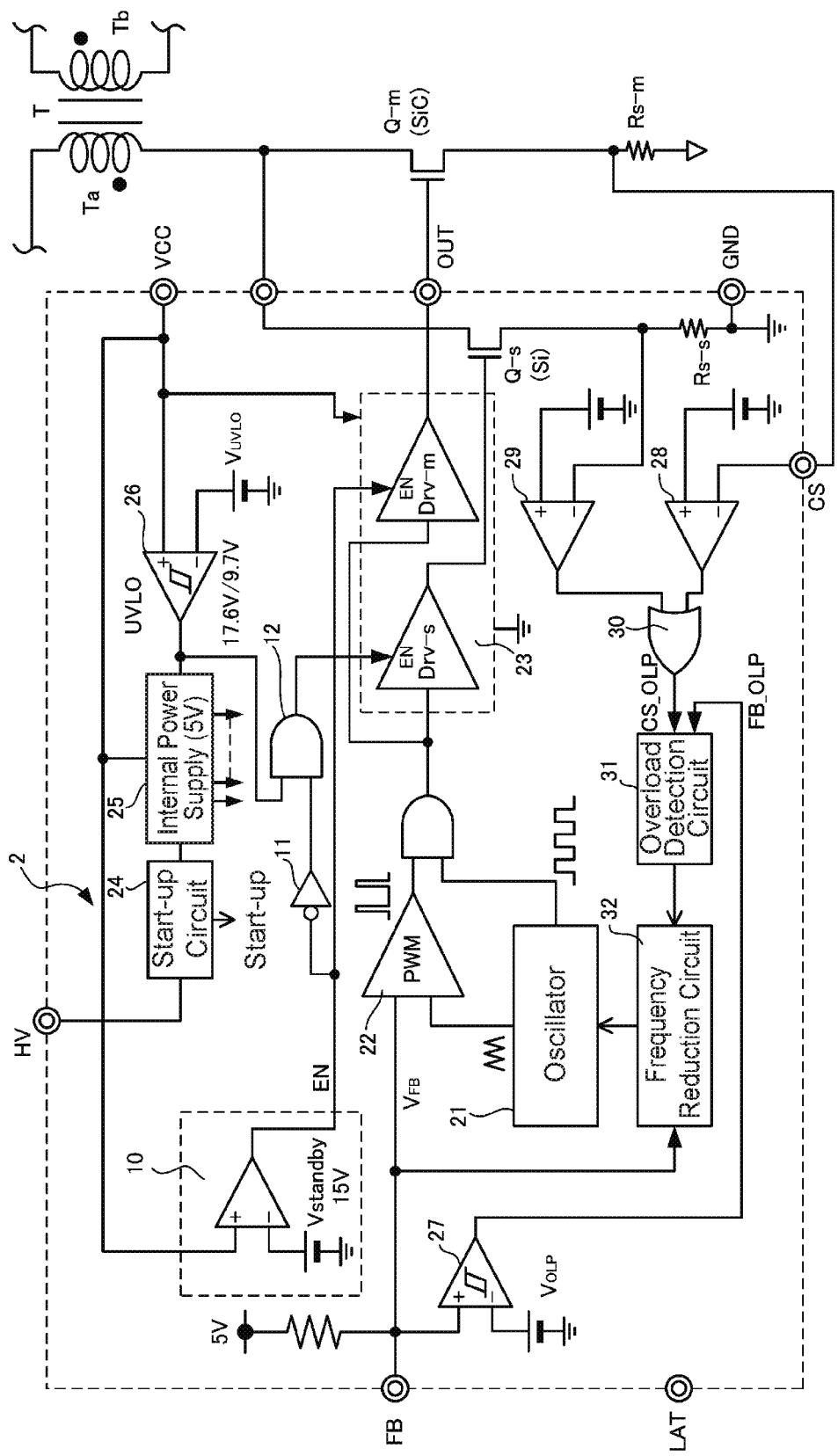
FIG. 2 illustrates an example of a configuration of a control circuit for the switching power supply illustrated in FIG. 1.

Moreover, as illustrated in FIG. 2, for example, a control circuit 2 includes a main driver circuit Drv-m that generates a main drive signal for switching the main switching device Q-m ON and OFF in accordance with a prescribed control signal as well as a secondary driver circuit Drv-s that generates a secondary drive signal for switching the secondary switching device Q-s ON and OFF. The main driver circuit Drv-m and the secondary driver circuit Drv-s are arranged in parallel, for example, and respectively generate the main drive signal and the secondary drive signal in accordance with the control signal.

As illustrated in FIG. 2, the present embodiment further includes an enable control circuit 10 that compares a voltage Vcc of an auxiliary voltage obtained from an auxiliary coil Tc of the transformer T and supplied to a power supply terminal VCC of the control circuit 2 with a threshold voltage Vstandby at which standby mode is enabled and then generates an enable signal EN. When the voltage Vcc of the auxiliary voltage is greater than the threshold voltage Vstandby (15V, for example), the enable control circuit 10 sets the enable signal EN to a high level to enable generation of the main drive signal by the main driver circuit Drv-m. At the same time, the high-level enable signal EN from the enable control circuit 10 is inverted to a low-level signal by an inverter 11 and applied to the secondary driver circuit Drv-s to disable generation of the secondary drive signal by secondary driver circuit Drv-s.

Moreover, when the voltage Vcc of the auxiliary voltage is less than the threshold voltage Vstandby, the enable control circuit 10 sets the enable signal EN to the low level to disable generation of the main drive signal by the main driver circuit Drv-m. At the same time, the low-level enable signal EN from the enable control circuit 10 is inverted to a high-level signal by the inverter 11 and applied to the secondary driver circuit Drv-s to enable generation of the secondary drive signal by the secondary driver circuit Drv-s.

In other words, the enable control circuit 10 alternatively activates the main driver circuit Drv-m and the secondary driver circuit Drv-s in accordance with the voltage Vcc of the auxiliary voltage in order to alternatively switch the main switching device Q-m and the secondary switching device Q-s ON and OFF.

As a result, the main switching device Q-m receives (via the gate thereof) the main drive signal output by the main driver circuit Drv-m and switches ON and OFF only during a normal operation mode in which the voltage Vcc of the auxiliary voltage is greater than the threshold voltage Vstandby. Moreover, during this time, the output of the secondary drive signal from the secondary driver circuit Drv-s is suspended, thereby suspending the ON/OFF switching of the secondary switching device Q-s.

Meanwhile, when the voltage Vcc of the auxiliary voltage becomes less than the threshold voltage Vstandby and a transition from normal operation mode to standby mode is therefore detected, the output of the main drive signal from the main driver circuit Drv-m is suspended. This suspends the ON/OFF switching of the main switching device Q-m. Moreover, the secondary switching device Q-s begins switching ON and OFF due to the secondary drive signal output from the secondary driver circuit Drv-s and thereby begins switching current flowing through the primary coil Ta of the transformer T ON and OFF in place of the main switching device Q-m.

Here, the main driver circuit Drv-m and the secondary driver circuit Drv-s respectively generate the main drive signal and the secondary drive signal upon receiving the control signal, which corresponds to a voltage $V_{FB}$ of a feedback signal. The control signal that corresponds to the voltage $V_{FB}$ of the feedback signal is a signal for controlling the switching frequency fsw of the main switching device Q-m and the secondary switching device Q-s.

Figure 3:
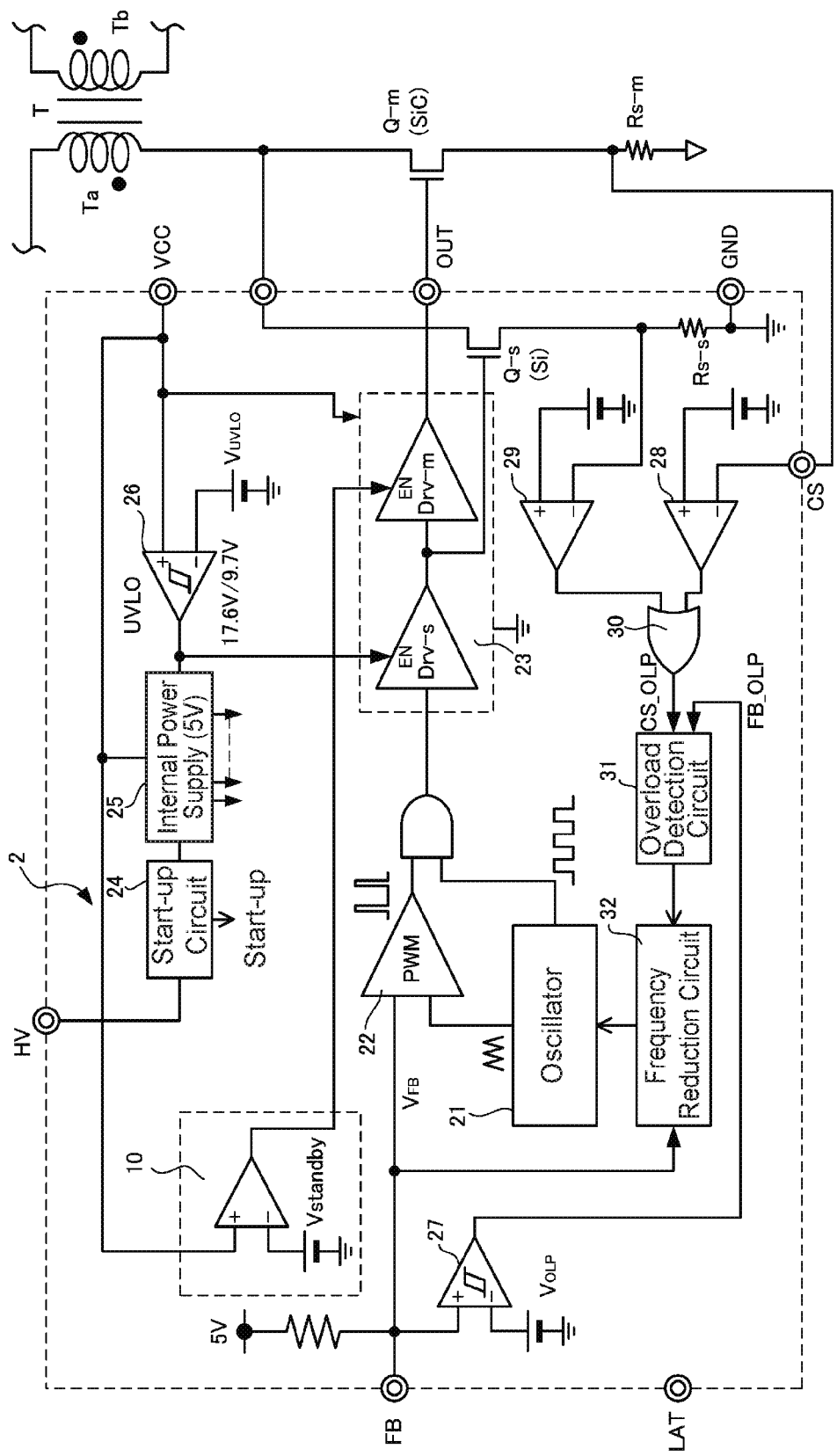
FIG. 3 illustrates another example of a configuration of a control circuit for the switching power supply illustrated in FIG. 1.

Alternatively, as illustrated in FIG. 3, for example, the main driver circuit Drv-m and the secondary driver circuit Drv-s of the control circuit 2 can be implemented as part of a driver circuit constituted by a plurality of stages of amplifiers that are typically cascade-connected within the control circuit 2. More specifically, the main driver circuit Drv-m is implemented as the amplifier in the last stage of the driver circuit, and the secondary driver circuit Drv-s is implemented as the amplifier upstream of the main driver circuit Drv-m.

Here, when the voltage Vcc of the auxiliary voltage is greater than the threshold voltage Vstandby (15V, for example), the enable control circuit 10 sets the enable signal EN to a high level to enable generation of the main drive signal by the main driver circuit Drv-m. Moreover, when the supply voltage Vcc is less than the threshold voltage Vstandby, the enable control circuit 10 sets the enable signal EN to the low level to disable generation of the main drive signal by the main driver circuit Drv-m. In other words, in the embodiment illustrated in FIG. 3, the secondary driver circuit Drv-s is not controlled by the enable control circuit 10 and always generates the secondary drive signal for switching the secondary switching device Q-s ON and OFF.

Therefore, in the control circuit 2 illustrated in FIG. 3, the main switching device Q-m and the secondary switching device Q-s are switched ON and OFF in parallel while the enable signal EN is at the high level. In this case, current flowing through the primary coil Ta of the transformer T is switched ON and OFF primarily by the main switching device Q-m. During this time, current flowing through the primary coil Ta of the transformer T is also switched ON and OFF by the secondary switching device Q-s at the same time as by the main switching device Q-m. However, the current switched ON and OFF by the secondary switching device Q-s is much smaller than the current switched ON and OFF by the main switching device Q-m due to the difference in on-resistance between the main switching device Q-m and the secondary switching device Q-s. Therefore, while the main switching device Q-m is switching ON and OFF, the current switched ON and OFF by the secondary switching device Q-s can be substantially ignored.

Furthermore, while the enable signal EN is at the low level, only the secondary switching device Q-s is switched ON and OFF. In this case, current flowing through the primary coil Ta of the transformer T is switched ON and OFF by the secondary switching device Q-s. In other words, when the voltage Vcc of the auxiliary voltage becomes less than the threshold voltage Vstandby, the current flowing through the primary coil Ta of the transformer T is controlled only by the ON/OFF switching of the secondary switching device Q-s.

Thus, while the load is light, the ON/OFF switching of the main switching device Q-m constituted by the SiC MOSFET is suspended, and only the secondary switching device Q-s constituted by the Si MOSFET switches ON and OFF. This makes it possible to significantly reduce overall switching loss in the switching power supply in comparison with switching the main switching device Q-m ON and OFF while the load is light. This, in turn, makes it possible to prevent thermal runaway in the main switching device Q-m as well as to reduce the power consumption thereof while the load is light.

Moreover, here the secondary drive signal generated by the secondary driver circuit Drv-s is input to the main driver circuit Drv-m as a control signal for making the main driver circuit Drv-m generate the main drive signal. Therefore, the switching frequency fsw of the main switching device Q-m is also controlled in accordance with the voltage $V_{FB}$ of the feedback signal.

Here, the low-power MOSFET used as the secondary switching device Q-s can be integrated into the control circuit 2 that is implemented as a power supply IC. However, the switching power supply 1 may also be configured with the secondary switching device Q-s being provided outside of the control circuit 2 along with the main switching device Q-m.

Next, switching frequency reduction control in the control circuit 2 that is implemented as a power supply IC will be briefly described. Here, an example of a configuration for the control circuit 2 will be described using the switching power supply 1 constituted by the flyback DC-DC converter having the configuration illustrated in FIG. 5 as an example. However, the present invention is applicable to either a primary-side regulated or a secondary-side regulated switching power supply as well as to either a flyback or a forward switching power supply.

As respectively illustrated in FIGS. 2 and 3, for example, the control circuit 2 includes a voltage-controlled oscillator 21 for which a standard oscillating frequency is defined in advance. This oscillator 21 uses the charges and discharges of a built-in capacitor (not illustrated in the figure) in the oscillator 21 to generate a triangular wave signal in which the voltage gradually increases and gradually decreases in a repeating manner and with a prescribed period as well as a rectangular wave signal that is synchronized with the triangular wave signal, for example. A PWM control comparator 22 compares the voltage of the triangular wave signal output by the oscillator 21 to the voltage $V_{FB}$ of the feedback signal in order to generate a control signal having a pulse width that defines the ON time Ton of the main switching device Q-m and the secondary switching device Q-s.

Moreover, in the control circuit 2 illustrated in FIG. 2, the main driver circuit Drv-m and the secondary driver circuit Drv-s are arranged in parallel as described above to form a driver circuit 23. Furthermore, in the control circuit 2 illustrated in FIG. 3, a plurality of (here, two) amplifiers are cascade-connected as described above to form a driver circuit 23 in which the amplifier in the last stage is the main driver circuit Drv-m and the amplifier upstream thereof is the secondary driver circuit Drv-s.

Figure 5:
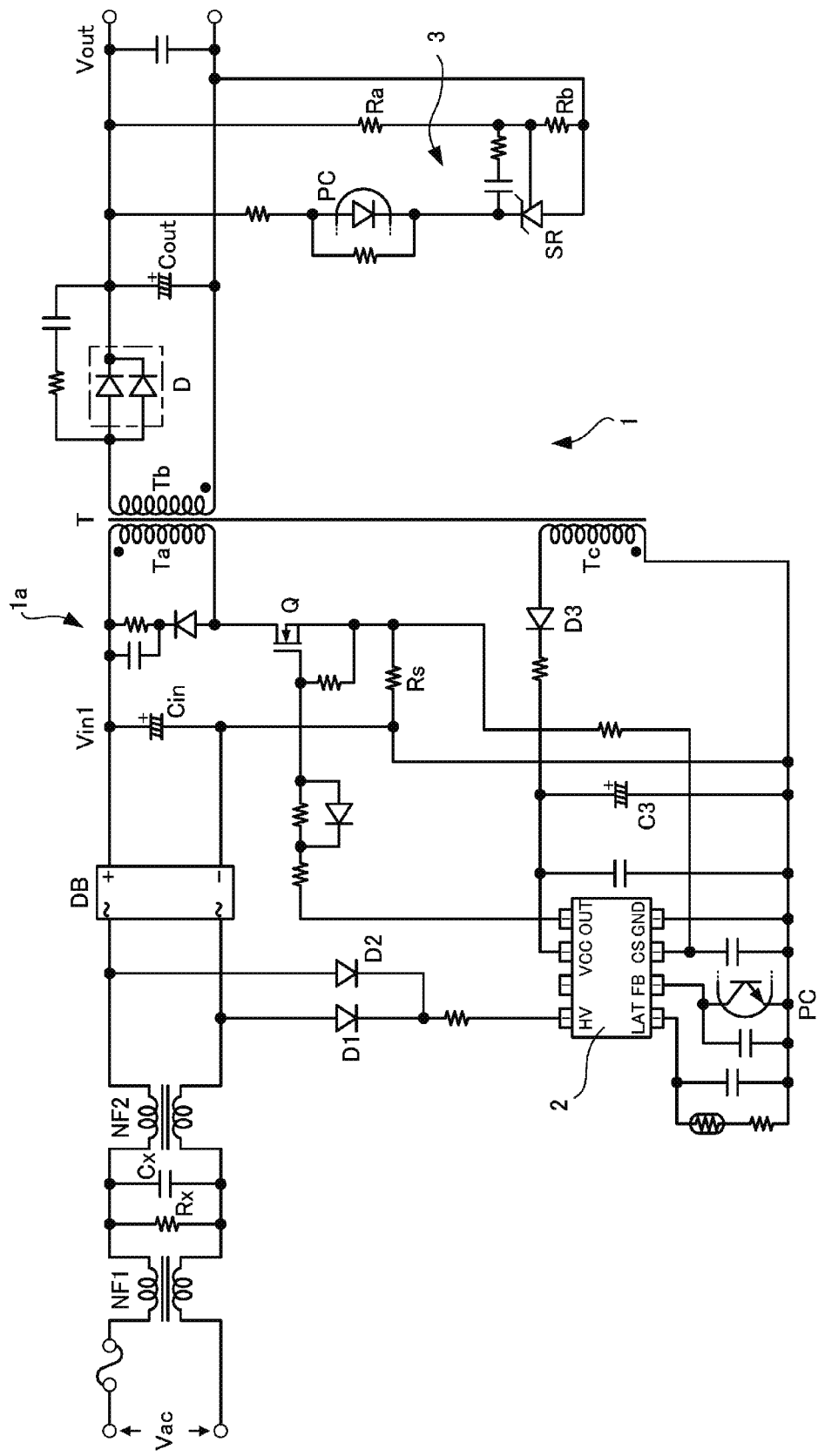
FIG. 5 illustrates an example of a configuration of a conventional switching power supply.
Figure 6A:
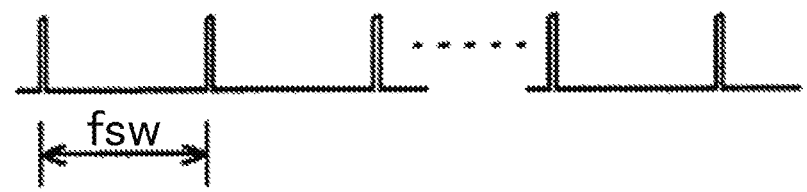
FIGS. 6A and 6B illustrate an example of a switching device drive signal waveform for use in a continuous switching scheme as well as an example of a frequency reduction control scheme implemented on the basis of the voltage of a feedback signal that corresponds to the power consumption of a load.
Figure 6B:
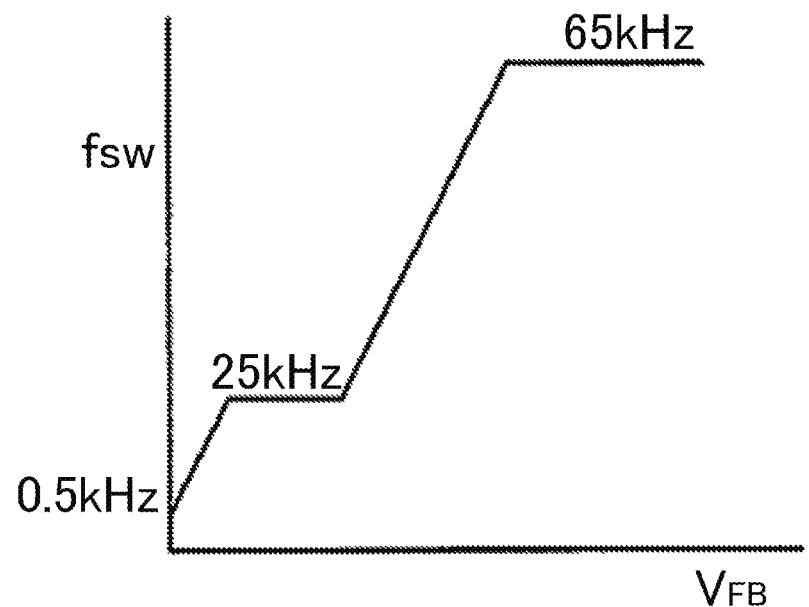
Figure 7A:
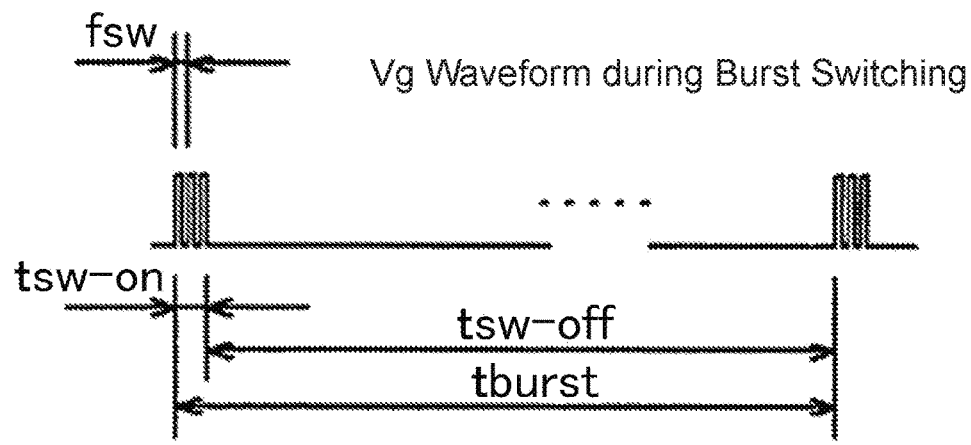
FIGS. 7A and 7B illustrate an example of a switching device drive signal waveform for use in a burst switching scheme as well as an example of a combined frequency reduction and burst switching control scheme implemented on the basis of the voltage of a feedback signal that corresponds to the power consumption of a load.
Figure 7B:
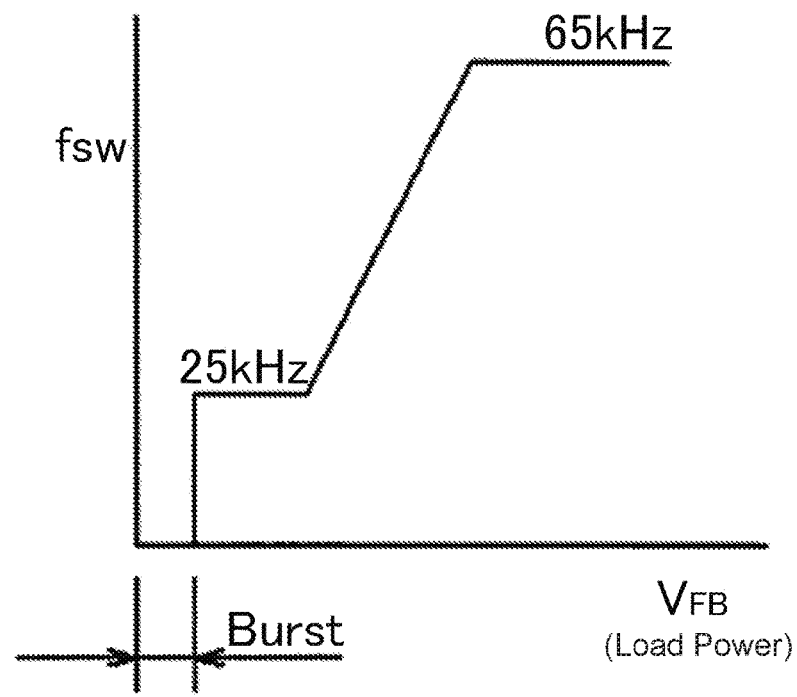
Figure 8A:
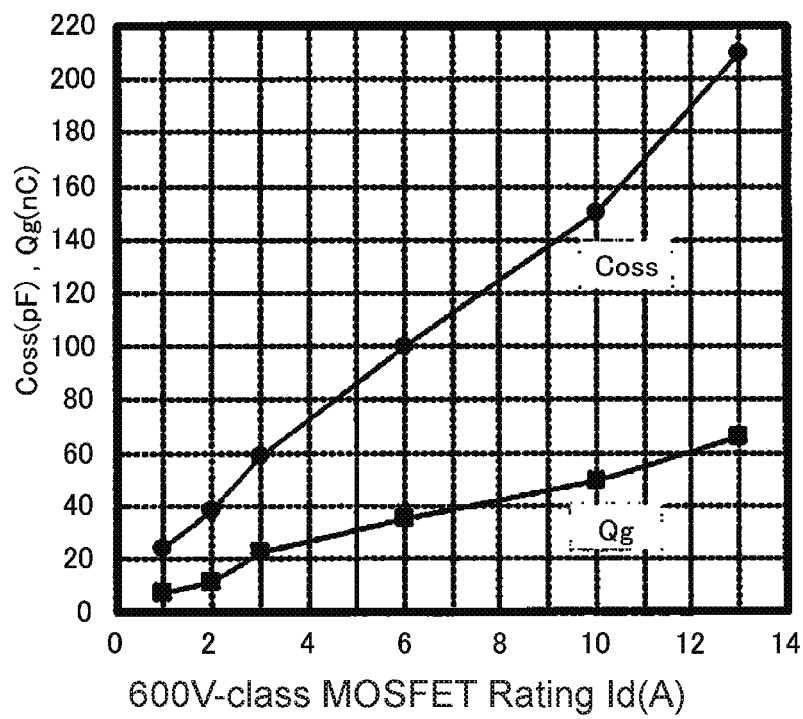
FIGS. 8A and 8B show the rated performance of a general-purpose MOSFET in the 600V class as well as a comparison of the switching losses associated with a continuous switching scheme and a burst switching scheme.
Figure 8B:
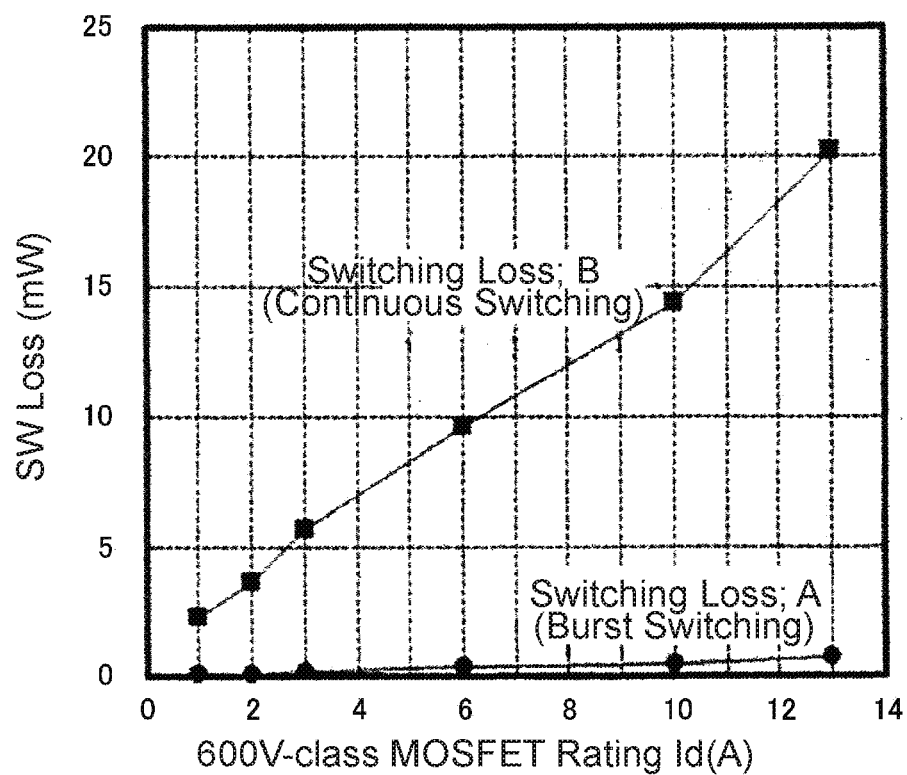
Figure 9A:
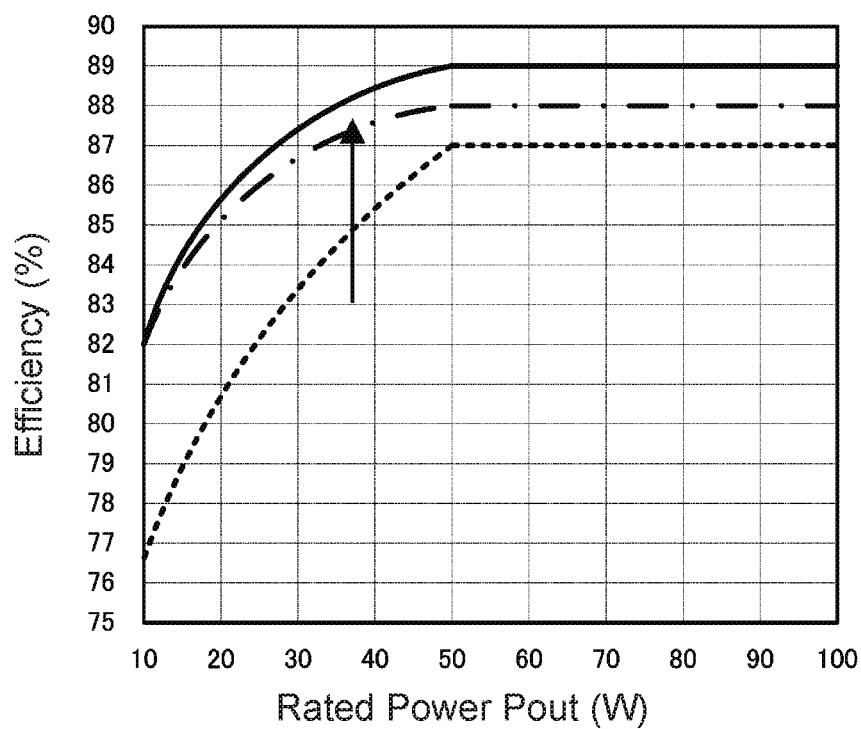
FIGS. 9A and 9B show trends in switching power supply requirements for average power conversion efficiency while under heavy load as well as for standby power while under light load.
Figure 9B:
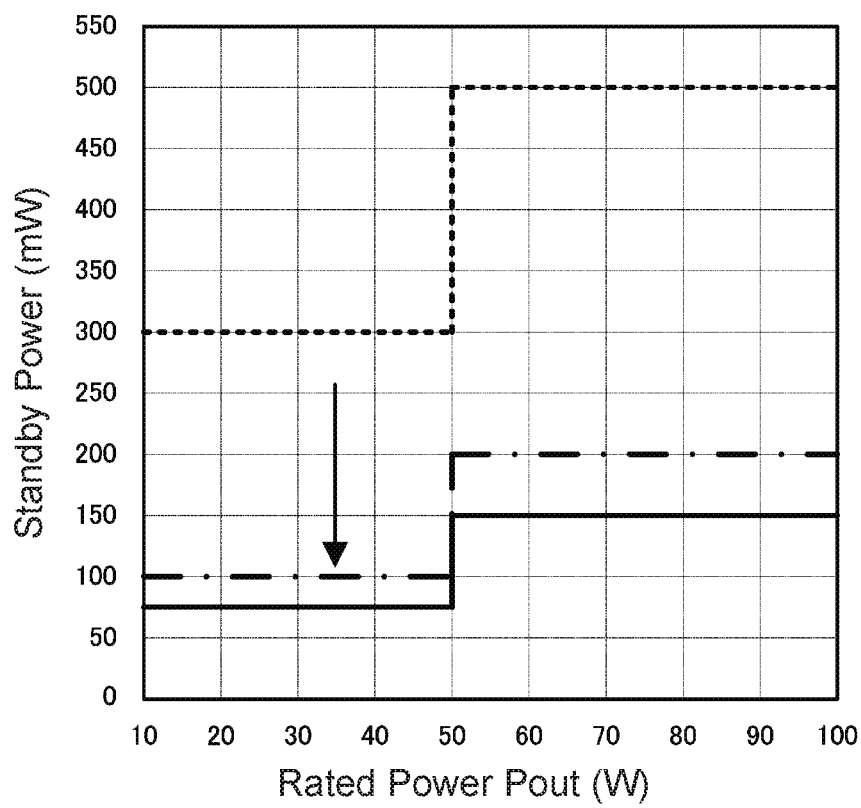
Figures 10A, 10B:
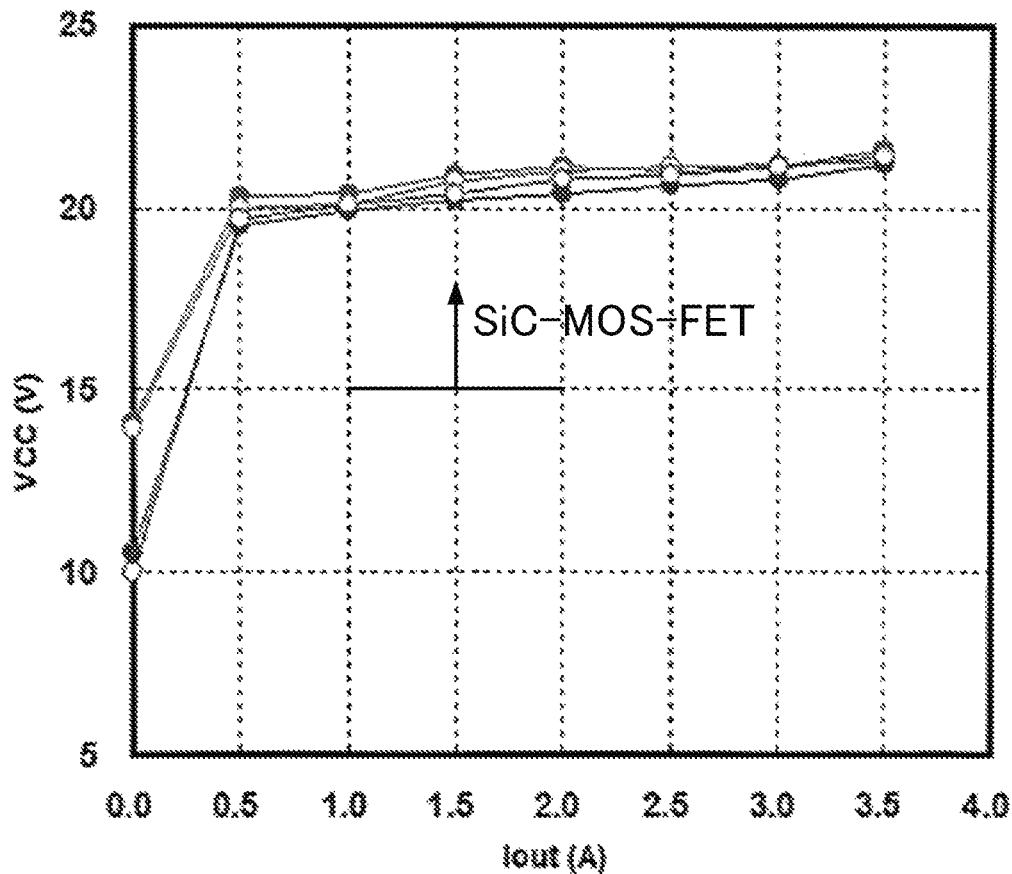
FIGS. 10A and 10B show the relationship between output current and the voltage obtained from an auxiliary coil in the switching power supply illustrated in FIG. 5 as well as operating characteristics of SiC MOSFETs and Si MOSFETs.

In addition, similar to in the switching power supply 1 illustrated in FIG. 5, an input voltage Vin is applied to an HV terminal of the control circuit 2 via diodes D1 and D2 that full-wave rectify AC power supplied from a commercial AC power source. Also similar to in the switching power supply 1 illustrated in FIG. 5, a voltage induced in the auxiliary coil Tc of the transformer T as the switching devices Q are switched ON and OFF is passed through a rectifying and smoothing circuit constituted by a diode D3 and a capacitor C3 and then input to the power supply terminal VCC of the control circuit 2. Moreover, in the present embodiment, a current detection voltage Vcs that corresponds to the ON current (drain current Id) of the main switching device Q-m as detected by a shunt resistor Rs-m arranged on the current path formed by the main switching device Q-m is input to a CS terminal of the control circuit 2. Furthermore, the control circuit 2 includes a built-in shunt resistor Rs-s arranged on the current path formed by the secondary switching device Q-s. This shunt resistor Rs-s detects the current detection voltage Vcs that also corresponds to the ON current (drain current Id) of the secondary switching device Q-s.

The control circuit 2 illustrated in FIG. 2 further includes a start-up circuit 24 that starts the control circuit 2 when a prescribed voltage is applied to the HV terminal as well as an internal power supply 25 that uses the voltage Vcc of the auxiliary voltage applied to the power supply terminal VCC to generate an internal drive voltage (5V) that is required to drive the control circuit 2. Moreover, the control circuit 2 also includes a UVLO comparator 26 that compares the voltage Vcc of the auxiliary voltage applied to the VCC terminal to a prescribed reference voltage $V_{UVLO}$ (9.7V, for example) in order to prevent malfunctions of the switching power supply 1 due to abnormal decreases in the voltage Vcc of the auxiliary voltage. Upon detecting an abnormal decrease in the voltage Vcc of the auxiliary voltage, this UVLO comparator 26 sets an abnormal operation protection signal to a low level. This abnormal operation protection signal is input to the secondary driver circuit Drv-s via an AND circuit 12 to force-disable operation of the secondary driver circuit Drv-s.

The control circuit 2 further includes an overload detection comparator 27 that compares the voltage $V_{FB}$ of the feedback signal to a prescribed reference voltage $V_{OLP}$ in order to detect overloading of the switching power supply 1. Moreover, the control circuit 2 also includes an overcurrent detection comparator 28 that detects overcurrent flowing through the main switching device Q-m from the voltage input to the CS terminal upon occurring across the resistor Rs-m that is connected in series to the main switching device Q-m. The control circuit 2 further includes an overcurrent detection comparator 29 that detects overcurrent flowing through the secondary switching device Q-s from the voltage across the resistor Rs-s that is connected in series to the secondary switching device Q-s. The overcurrent detection respectively signals obtained from the comparators 28 and 29 are then input via an OR circuit 30 to an overload detection circuit 31. The overload detection signal detected by the comparator 27 is also input to the overload detection circuit 31.

Meanwhile, the control circuit 2 also includes a frequency reduction circuit 32 that voltage-controls the operation of the oscillator 21 in accordance with the voltage $V_{FB}$ of the feedback signal input to an FB terminal at all times (that is, not only when the overload detection circuit 31 detects overloading) in order to variably control the oscillating frequency fsw. The voltage $V_{FB}$ of the feedback signal changes according to the power consumption of the load (that is, the load power), and the larger the load power becomes, the higher the voltage $V_{FB}$ becomes.

The frequency reduction circuit 32 (a switching frequency control unit) reduces the switching frequency fsw at which the main switching device Q-m and the secondary switching device Q-s are switched ON and OFF in accordance with the voltage $V_{FB}$ of the feedback signal, which decreases as the power consumption of the load decreases. More specifically, the switching frequency fsw is reduced, in accordance with the voltage $V_{FB}$ of the feedback signal, from a maximum switching frequency fsw-max (such as 65 kHz) for when the load is heaviest to a first switching frequency fsw-min (such as 25 kHz) for when the load is lightest.

Furthermore, in normal operation mode, if the power consumption of the load becomes less than a prescribed threshold value while the main switching device Q-m is being continuously switched at the first switching frequency fsw-min, the frequency reduction circuit 32 reduces the switching frequency fsw of the main switching device Q-m and the secondary switching device Q-s to a value even less than the first switching frequency fsw-min in order to enable standby mode (two-stage switching frequency reduction control).

In addition to this switching frequency fsw reduction control feature, the control circuit 2 also includes the enable control circuit 10 described above. When the power consumption of the load decreases to the condition at which the switching power supply 1 is put into standby mode, the enable control circuit 10 outputs an enable signal EN that stops the operation of the main driver circuit Drv-m. More specifically, the enable control circuit 10 is implemented as a comparator that compares the supply voltage Vcc to the threshold voltage Vstandby for determining when to transition from normal operation mode to standby mode. The enable control circuit 10 then outputs the enable signal EN, which is set to high when the supply voltage Vcc is greater than the threshold voltage Vstandby and is set to low when the supply voltage Vcc is less than the threshold voltage Vstandby. This enable signal EN controls the operation of the main driver circuit Drv-m.

The control circuit 2 configured as described above controls the switching frequency fsw at which the main switching device Q-m is switched ON and OFF in accordance with the load power, as also described above. Furthermore, the control circuit 2 makes it possible to stop switching the main switching device Q-m ON and OFF and to switch just the secondary switching device Q-s ON and OFF upon transitioning from normal operation mode to standby mode. Here, the Si MOSFET used for the secondary switching device Q-s has a lower power capacity than the main switching device Q-m and also has a sufficiently low output capacitance Coss and gate charge Qg. Therefore, even if the secondary switching device Q-s is continuously switched during standby mode, the switching loss can be kept less than or equal to a sufficiently small value of 10 mW, for example. As a result, the power consumption of the switching power supply 1 in standby mode can be sufficiently reduced by an amount proportional to the reduction in loss (switching loss) in the secondary switching device Q-s in standby mode.

Furthermore, as described above, the secondary switching device Q-s can be easily integrated as part of the control circuit 2 that is implemented as a power supply IC. In addition, the comparator for the enable control circuit 10 described above can also easily be integrated into the control circuit 2. This makes it possible to reduce switching loss and to thereby effectively reduce power consumption in standby mode. Moreover, utilizing the device characteristics of the main switching device Q-m that is constituted by the SiC MOSFET makes it possible to improve power conversion efficiency while under heavy load.

More specifically, in standby mode, the ON/OFF switching of the main switching device Q-m constituted by the SiC MOSFET is disabled. Therefore, even if the supply voltage Vcc obtained from the auxiliary coil Tc decreases in response to decreases in the output current Tout while under light load, this will not cause thermal runaway in the main switching device Q-m that is constituted by the SiC MOSFET. This makes it possible to provide, at low cost, a switching power supply 1 that has a simple configuration and makes it possible to increase power conversion efficiency while under heavy load as well as to reduce power consumption while under light load.

Figure 4:
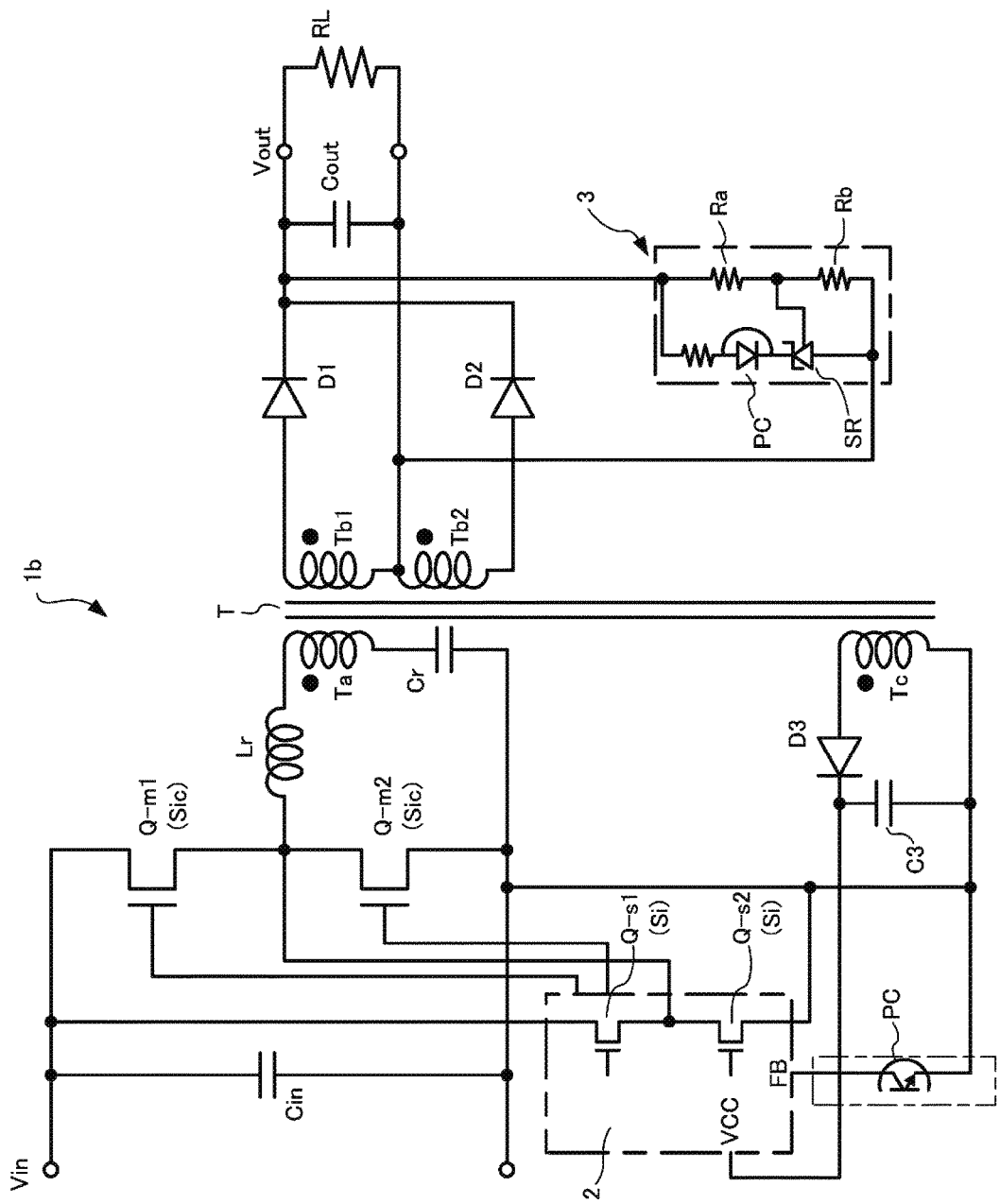
FIG. 4 schematically illustrates a configuration of the main components of a switching power supply according to another embodiment of the present invention.

The present invention is also applicable to a switching power supply 1b configured as a so-called LLC converter such as that illustrated in FIG. 4, for example, that controls current flowing through an LLC current-resonant circuit.

The LLC converter 1b illustrated in FIG. 4 includes an LLC current-resonant circuit, which is typically formed by connecting an inductor Lr and a capacitor Cr in series to a primary coil Ta of a transformer T. The LLC converter further includes first switching devices Q1 and second switching devices Q2 that are connected in series to form half-bridge circuits connected between a power supply terminal and a ground terminal. The first and second switching devices Q1 and Q2 receive control signals and switch ON and OFF alternately relative to one another to control, from a node therebetween, current flowing through the LLC current-resonant circuit. Moreover, voltages induced in secondary coils Tb1 and Tb2 of the transformer T are rectified by diodes D1 and D2 and then smoothed by an output capacitor Cout to generate an output voltage Vout.

As illustrated in FIG. 4, when the present invention is applied to the LLC converter configured as described above, SiC MOSFETs are used for first and second main switching devices Q-m1 and Q-m2 that are switched ON and OFF while the load is heavy. Moreover, low-power Si MOSFETs are used for first and second secondary switching devices Q-s1 and Q-s2 that are integrated into a control circuit 2 arranged in parallel with the first and second main switching devices Q-m1 and Q-m2.

Here, similar to in the embodiments described above, transitions from a heavy loading state to a light loading state (standby mode) are detected in accordance with a voltage Vcc of an auxiliary voltage obtained from an auxiliary coil Tc. Moreover, the main switching devices Q-m1 and Q-m2 should be controlled to stop switching ON and OFF while the load is light.

This switching power supply 1b configured as an LLC converter therefore exhibits the same advantageous effects as the switching power supply 1a configured as a flyback DC-DC converter as described above.

It should be noted that the present invention is not limited to the embodiments described above. For example, the same advantageous effects of reducing overall switching loss in the switching devices can be achieved even in a combined control scheme in which frequency reduction control is used while the switching devices are continuously switched and intermittent burst switching control is used while in standby mode. Furthermore, the present invention ultimately makes it possible to reduce switching loss to a value substantially equal to zero in standby mode (as defined by the International Electrotechnical Commission (IEC): losses of less than 5 mW are treated as being substantially equal to zero).

The present invention can also be applied when driving a plurality of MOSFETs in parallel as the main switching device Q-m in order to achieve a certain rated power capacity. Furthermore, while the main switching device Q-m is switching ON and OFF, the ON/OFF switching of the secondary switching device Q-s may be suspended. In this case, the main driver circuit Drv-m and the secondary driver circuit Drv-s are arranged in parallel, and control signals are respectively input to the main driver circuit Drv-m and the secondary driver circuit Drv-s. Moreover, the main driver circuit Drv-m and the secondary driver circuit Drv-s should be configured such that only one is driven by the enable signal. In addition, various other modifications may be made without departing from the spirit of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
a main switching device made of a SiC MOSFET having silicon carbide as a semiconductor material thereof, configured to be attached to a primary coil of a transformer so as to switch a main current flowing in the primary coil ON and OFF;
a secondary switching device made of a Si MOSFET having silicon as a semiconductor material thereof, configured to be attached to the primary coil of the transformer in parallel with the main switching device, the secondary switching device thereby being connected in parallel with the main switching device so as to switch the main current flowing in the primary coil ON and OFF instead of the main switching device; and
a control circuit that controls ON/OFF switching of the main switching device and the secondary switching device in accordance with a feedback voltage representing an output voltage obtained from a secondary coil of the transformer, the control circuit generating a control signal in accordance with the feedback signal,
wherein the control circuit includes:
a driver circuit that operates using an auxiliary voltage obtained from an auxiliary coil of the transformer as a supply voltage and that switches the main switching device and the secondary switching device ON and OFF based on the control signal; and
an enable control circuit that controls, in accordance with the auxiliary voltage obtained from the auxiliary coil of the transformer, whether to enable driving of the main switching device and driving of the secondary switching device by the driver circuit,
wherein when the auxiliary voltage obtained from the auxiliary coil of the transformer is greater than a prescribed threshold voltage, the control circuit causes the main switching device to switch ON and OFF, and
wherein when the auxiliary voltage obtained from the auxiliary coil of the transformer is less than the prescribed threshold voltage, the control circuit disables operation of the main switching device and causes the secondary switching device to switch ON and OFF.

2. The switching power supply according to claim 1, wherein the main switching device is a high-power SiC MOSFET that satisfies a prescribed load power capacity, and the secondary switching device is a Si MOSFET with a lower power capacity than the main switching device.

3. The switching power supply according to claim 2, wherein the secondary switching device is a low-power Si MOSFET that is integratable into the control circuit.

4. The switching power supply according to claim 1, wherein the driver circuit includes:
a main driver circuit that generates, in accordance with the control signal, a main drive signal for switching the main switching device ON and OFF; and
a secondary driver circuit that generates, in accordance with the control signal, a secondary drive signal for switching the secondary switching device ON and OFF.

5. The switching power supply according to claim 4,
wherein when the auxiliary voltage obtained from the auxiliary coil of the transformer is greater than the prescribed threshold voltage, the enable control circuit generates an enable signal that is set to HIGH and provides the HIGH enable signal to the main driver circuit and an inverse of the HIGH enable signal to the secondary driver circuit, respectively, so as to enable operation of the main driver circuit and disable operation of the secondary driver circuit, and
wherein when the auxiliary voltage obtained from the auxiliary coil of the transformer is less than the prescribed threshold voltage, the enable control circuit generates the enable signal that is set to LOW and provides the LOW enable signal to the main driver circuit and an inverse of the LOW enable signal to the secondary driver circuit, respectively, so as to disable operation of the main driver circuit and enable operation of the secondary driver circuit.

6. The switching power supply according to claim 1,
wherein the driver circuit includes:
a secondary driver circuit that generates, in accordance with the control signal, a secondary drive signal for switching the secondary switching device ON and OFF; and
a main driver circuit that generates, in accordance with the secondary drive signal generated by the secondary driver circuit, a main drive signal for switching the main switching device ON and OFF.

7. The switching power supply according to claim 6,
wherein when the auxiliary voltage obtained from the auxiliary coil of the transformer is greater than the prescribed threshold voltage, the enable control circuit generates an enable signal that is set to HIGH and provides the HIGH enable signal to the main driver circuit so as to enable operation of the main driver circuit, and
wherein when the auxiliary voltage obtained from the auxiliary coil of the transformer is less than the prescribed threshold voltage, the enable control circuit generates the enable signal that is set to LOW and provides the LOW enable signal to the main driver circuit so as to disable operation of the main driver circuit.

8. The switching power supply according to claim 1,
wherein the control circuit includes a switching frequency control unit that reduces a switching frequency at which the main switching device and the secondary switching device are switched ON and OFF from a maximum switching frequency towards a first switching frequency in accordance with decreases in power consumption of a load, and
wherein when the power consumption of the load becomes less than a prescribed threshold power while the main switching device and the secondary switching device are being continuously switched at the first switching frequency, the switching frequency control unit further reduces the switching frequency of the main switching device and the secondary switching device, or the switching frequency of the secondary switching device, to a value less than the first switching frequency.

9. The switching power supply according to claim 1,
wherein the control circuit includes a switching frequency control unit that reduces a switching frequency at which the main switching device and the secondary switching device are switched ON and OFF from a maximum switching frequency towards a first switching frequency in accordance with decreases in power consumption of a load, wherein when the power consumption of the load becomes less than a prescribed threshold power while the main switching device and the secondary switching device are being continuously switched at the first switching frequency, the control circuit drives the main switching device and the secondary switching device, or the secondary switching device only, in a burst switching mode with prescribed burst period and frequency.

10. The switching power supply according to claim 8, wherein when the switching frequency control unit reduces the switching frequency from the maximum switching frequency to the first switching frequency, and when the feedback voltage and the auxiliary voltage are reduced thereby, the enable control circuit disables operation of the main switching device.

11. The switching power supply according to claim 9, wherein when the switching frequency control unit reduces the switching frequency from the maximum switching frequency to the first switching frequency, and when the feedback voltage and the auxiliary voltage are reduced thereby, the enable control circuit disables operation of the main switching device.

12. The switching power supply according to claim 8, wherein said prescribed threshold power for evaluating the power consumption of the load corresponds to a threshold voltage for the auxiliary voltage at which a standby mode is enabled and operation of the main switching device is disabled.

13. The switching power supply according to claim 9, wherein said prescribed threshold power for evaluating the power consumption of the load corresponds to a threshold voltage for the auxiliary voltage at which a standby mode is enabled and operation of the main switching device is disabled.

14. The switching power supply according to claim 1, wherein the main switching device and the secondary switching device are configured to be respectively connected in series to the primary coil of the transformer and arranged between a power supply terminal and a ground terminal to form a flyback converter.

15. The switching power supply according to claim 1, further comprising:

another main switching device that is connected in series to said main switching device to form a main half-bridge circuit and that is switched ON and OFF complementarily relative to said main switching device; and another secondary switching device that is connected in series to said secondary switching device to form a secondary half-bridge circuit and that is switched ON and OFF complementarily relative to said secondary switching device, wherein the main half-bridge circuit and the secondary half-bridge circuit are respectively configured in parallel with an LLC current-resonant circuit in which an inductor and a capacitor are connected in series to the primary coil of the transformer.

16. The switching power supply according to claim 1, wherein when the auxiliary voltage obtained from the auxiliary coil of the transformer is greater than the prescribed threshold voltage, the control circuit disables operation of the secondary switching device while causing the main switching device to switch ON and OFF.

17. The switching power supply according to claim 1, wherein when the auxiliary voltage obtained from the auxiliary coil of the transformer is greater than the prescribed threshold voltage, the control circuit also causes the secondary switching device to switch ON and OFF in addition to causing the main switching device to switch ON and OFF.

* * * * *